United States Patent
Lennox

(10) Patent No.: US 7,421,068 B2
(45) Date of Patent: Sep. 2, 2008

(54) METHODS, APPARATUS, COMPUTER PROGRAM PRODUCTS AND COMPUTER DATA SIGNALS FOR PROVISION OF VOICE MAILBOX SERVICES

(75) Inventor: John Joseph Lennox, Woodstock, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 794 days.

(21) Appl. No.: 10/462,291

(22) Filed: Jun. 16, 2003

(65) Prior Publication Data

US 2004/0252815 A1    Dec. 16, 2004

(51) Int. Cl.
*H04M 1/64* (2006.01)

(52) U.S. Cl. .............. 379/88.25; 379/88.17; 379/88.18; 232/52; 455/413

(58) Field of Classification Search .............. 379/88.22, 379/201.03, 114.2, 88.25, 88.17, 88.18; 705/14, 705/11; 232/52; 455/413
See application file for complete search history.

(56) References Cited

U.S. PATENT DOCUMENTS

| | | | |
|---|---|---|---|
| 6,381,316 B2 * | 4/2002 | Joyce et al. .............. | 379/114.2 |
| 6,836,762 B2 * | 12/2004 | Speicher ...................... | 705/14 |
| 7,065,496 B2 * | 6/2006 | Subbloie et al. ............... | 705/11 |

* cited by examiner

*Primary Examiner*—Gerald Gauthier
(74) *Attorney, Agent, or Firm*—Myers Bigel Sibley & Sajovec

(57) ABSTRACT

An electronic record is stored of an agreement between first and second parties for provision of voice mailboxes. An electronic voice mailbox configuration message for configuration of a voice mailbox for a third party is then received. The voice mailbox is automatically configured responsive to the received voice mailbox configuration message based on the stored electronic record of the agreement. For example, the voice mailbox may be configured to control access to the voice mailbox by the third party and/or configure a voice mailbox feature, such as a mailbox type, a pager notification feature, an operator zero out feature, a child mailbox feature, or a line sharing feature. The voice mailbox configuration message may be a Simple Object Access Protocol (SOAP) message that is received over a data communications network.

25 Claims, 3 Drawing Sheets

METHODS, APPARATUS, COMPUTER PROGRAM PRODUCTS AND COMPUTER DATA SIGNALS FOR PROVISION OF VOICE MAILBOX SERVICES

BACKGROUND OF THE INVENTION

A common feature of many voice communications services, such as telephone and wireless (cellular) services, is the provision of voicemail services. Such services typically allow a party attempting to call a subscriber to record a voice message when the subscriber is, for example, unavailable or engaged in a conversation with another party. Voicemail services are typically provided using a "mailbox" metaphor, and may include, for example, the ability to record greetings and to organize and manipulate recorded messages stored in the "voice mailbox."

FIG. 1 illustrates exemplary conventional operations for establishing such a voice mailbox. A customer calls the telephone company business office to request creation of a voice mailbox (Block 110). In response to the request, an employee at the business office generates a service order (Block 120) and conveys the service order to the company's voice mail provisioning system (Block 130). The voice mailbox provisioning system then creates the voice mailbox (Block 140). The customer may have to wait days for creation of the voice mailbox and may be unable to obtain real-time information about service status. In addition, service charges may be applied for creation of the voice mailbox, and further charges may be applied if the customer wishes to modify (e.g., add or delete) features of the voice mailbox.

SUMMARY OF THE INVENTION

According to some embodiments of the present invention, methods of providing voice mail services may be provided. An electronic record is stored of an agreement between first and second parties for provision of voice mailboxes. An electronic voice mailbox configuration message for configuration of a voice mailbox for a third party is then received. The voice mailbox is automatically configured responsive to the received voice mailbox configuration message based on the stored electronic record of the agreement. For example, the voice mailbox may be configured to control access to the voice mailbox by the third party and/or to configure a voice mailbox feature, such as a mailbox type, a pager notification feature, an operator zero out feature, a child mailbox feature, and/or a line sharing feature. In some embodiments, the voice mailbox configuration message includes a Simple Object Access Protocol (SOAP) message that is received over a data communications network.

According to further aspects of the present invention, a voice mail apparatus includes a database that stores an electronic record of an agreement between first and second parties for provision of voice mailboxes. The apparatus further includes a voice mailbox configuration server configured to receive from a data communications network an electronic voice mailbox configuration message for configuration of a voice mailbox for a third party and operative to automatically configure the voice mailbox responsive to the received voice mailbox configuration message based on the stored electronic record of the agreement. The voice mailbox configuration server may be operative to configure the voice mailbox to control access to the voice mailbox by the third party responsive to the received electronic voice mail configuration message. Such an apparatus may be used, for example, by a bulk voice mailbox provider.

According to further aspects of the present invention, a voice mail apparatus includes a database that stores an electronic record of an agreement between first and second parties for provision of voice mailboxes. The apparatus further includes a voice mailbox configuration client configured to transmit an electronic voice mailbox configuration message for automatic configuration of a voice mailbox for a third party under the agreement over a data communications network based on the stored electronic record of the agreement. The electronic voice mailbox configuration message may be configured to control voice mailbox access and/or voice mailbox features. Such an apparatus may be used, for example, by a voice mailbox reseller.

According to still further embodiments of the present invention, a computer program product for providing voice mail services may be provided. The computer program product includes program code embodied in a computer-readable storage medium. The program code includes first program code configured to store an electronic record of an agreement between first and second parties for provision of voice mailboxes, and second program code configured to receive an electronic voice mailbox configuration message for configuration of a voice mailbox for a third party and operative to automatically configure the voice mailbox responsive to the received voice mailbox configuration message based on the stored electronic record of the agreement. Such a computer program product may be used, for example, by a bulk voice mailbox provider.

In additional embodiments of the present invention, a computer program product includes program code embodied in a computer-readable storage medium, including first program code configured to store an electronic record of an agreement between first and second parties for provision of voice mailboxes, and second program code configured to create an electronic voice mailbox configuration message for automatic configuration of a voice mailbox for a third party based on the stored electronic record of the agreement. Such a computer program product may be used, for example, by a voice mailbox reseller.

According to additional aspects of the present invention, a computer data signal embodied in a signal transmission medium is provided. The computer data signal includes a voice mail configuration message for automatic configuration of a voice mailbox for a third party under an agreement between first and second parties for provision of voice mailboxes. The voice mail configuration message may include a Simple Object Access Protocol (SOAP) message.

DETAILED DESCRIPTION

Figure 1:
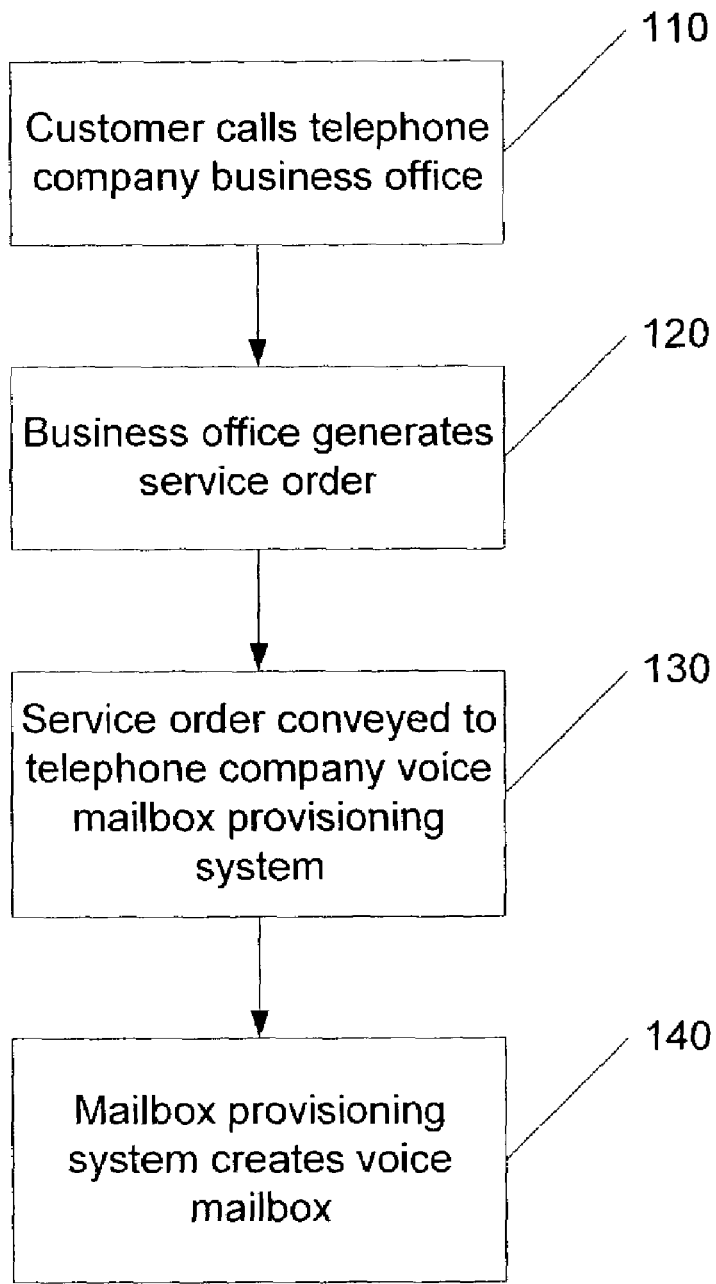
FIG. 1 is a schematic diagram illustrating conventional operations for configuration a voice mailbox.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present.

The present invention may be embodied as apparatus (systems), methods, and/or articles of manufacture, including computer program products and computer data signals. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention may also take the form of a computer data signal embodied in a signal transmission medium. In the context of this document, a signal transmission medium may be any medium that can contain, store, communicate, propagate, or transport the computer data signal. The signal transmission medium may include, but is not limited to, an electronic, magnetic, optical, electromagnetic, infrared, or semiconductor medium. More specific examples (a non-exhaustive list) of the signal transmission medium would include the following: an electrical connection having one or more wires, a wireless propagation medium, a portable computer diskette, a random access memory (RAM), a read-only memory (ROM), an erasable programmable read-only memory (EPROM or Flash memory), an optical fiber, and a portable compact disc read-only memory (CD-ROM).

The present invention is described herein with reference to flowchart and/or block diagram illustrations of methods, systems, computer data signals and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Computer data signals illustrated in the figures may be embodied in software and/or hardware forms. For example, a computer data signal according to some embodiments of the invention may be embodied in carrier-wave modulated data packets resident in a component of a data communications network, such as an electrical or optical transmission line, a hub, a router, a buffer, or the like.

Some embodiments of the present invention arise from a realization that voice mail services may be more efficiently and effectively provided and administered by providing an automated voice mailbox configuration interface that allows intermediaries, such as wireless service providers, colleges, small businesses, and the like, to configure pre-purchased voice mailboxes for their customers under a bulk voice mailbox arrangement with a bulk voice mailbox provider, such as a telephone operating company. In this manner, a secondary market in voice mailboxes can be administered without the use of a cumbersome service order process.

Figure 2:
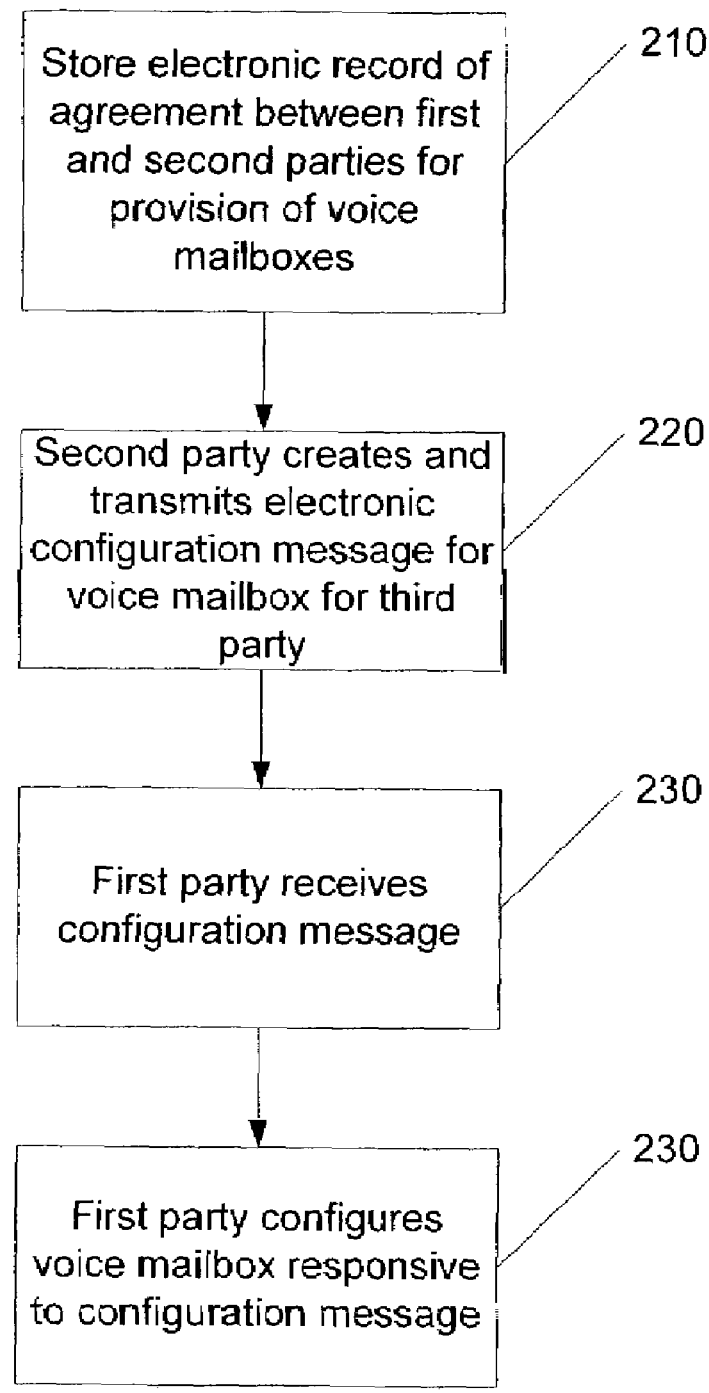
FIG. 2 is a flowchart illustrating exemplary operations of methods, apparatus, and computer program products for configuring a voice mailbox according to some embodiments of the present invention.

FIG. 2 illustrates exemplary operations for providing voice mail services according to some embodiments of the present invention. An electronic record is stored of an agreement between a first party (e.g., a bulk voice mailbox provider) and a second party (e.g., a voice mailbox reseller) to provide voice mailboxes for the second party (210). For example, the agreement may be an agreement to provide a predetermined number of voice mailboxes (e.g., for a fixed price), an agreement to provide a particular amount of voice mailbox space, an agreement to provide voice mailboxes at a particular rate, and/or some other arrangement. The record may include, for example, information as to the voice mailbox features that may be provided for pre-allocated voice mailboxes under the agreement, along with security information that may be utilized in verifying requests to configure voice mailboxes under the agreement. It will be appreciated that the record may take any of a number of different forms, and may include components that are distributed among multiple databases that are controlled by one or more parties.

Subsequently, the second party transmits an electronic voice mailbox configuration message for configuring a voice mailbox for a third party to the first party (Block 220). The message may be formatted according to an agreed-upon protocol, which may specify, for example, message fields for information for enabling access to the voice mailbox for the third party, configuring specific features of the voice mailbox, and the like. For example, the message may include configuration information, such as voice mailbox type information, pager notification information, operator zero out information, child mailbox information (e.g., mailbox hierarchies under root mailbox), and/or line sharing information. The message may also include, for example, commands for adding and/or deleting users and/or security information for verification before enacting a command.

Upon receipt of the message (Block 230), the first party configures the voice mailbox based on the received message (Block 240). For example, the first party may authenticate the received message, e.g., by examining password or other security information included in the message, and may then, based on the authentication process, proceed with configuration of the voice mailbox.

Figure 3:
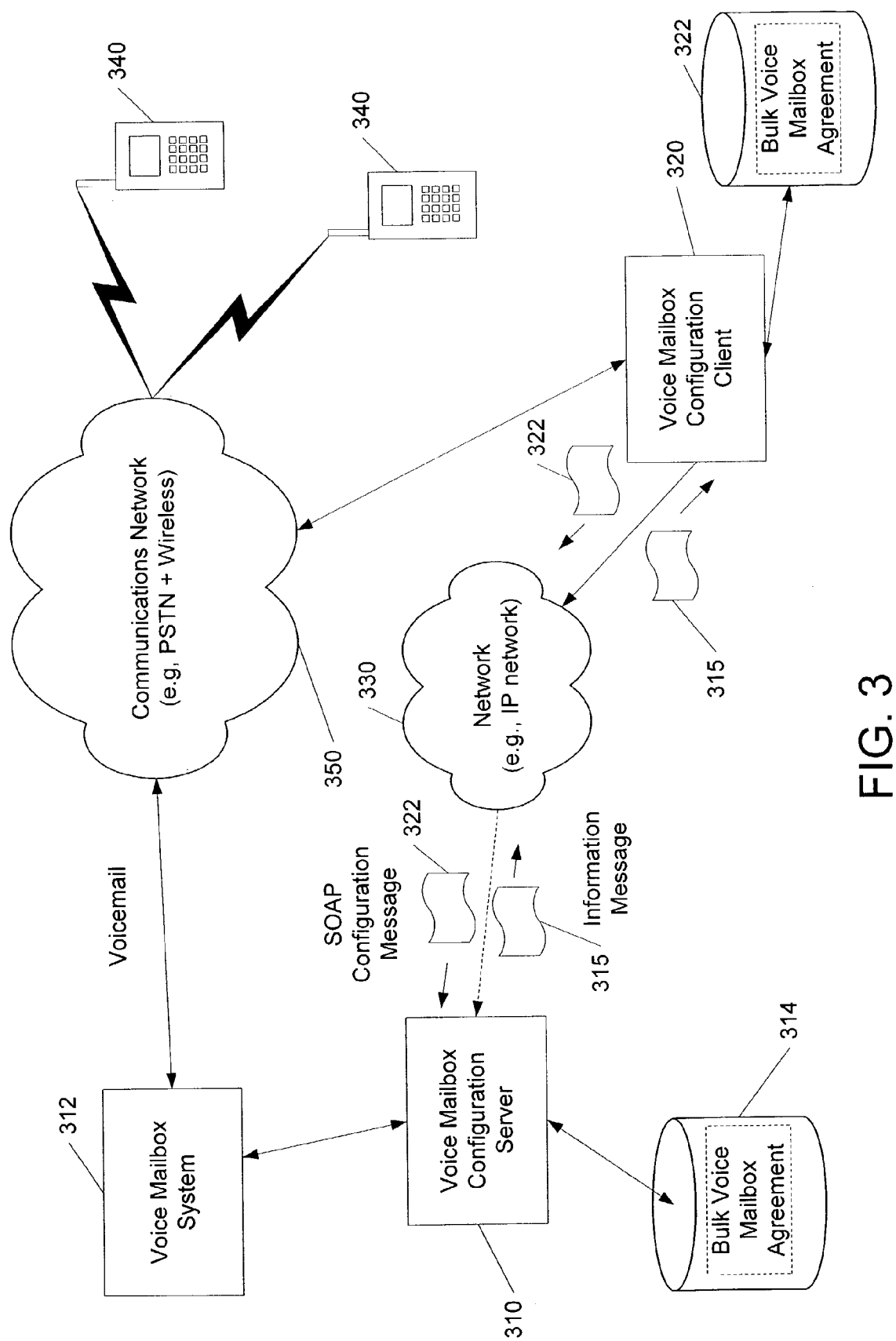
FIG. 3 is a schematic diagram illustrating exemplary apparatus, methods, computer program products and computer data signals for voice mailbox provisioning according to further embodiments of the present invention.

FIG. 3 illustrates exemplary apparatus, methods, computer program products and computer data signals for providing voice mailbox configuration according to further embodiments of the present invention. A voice mailbox configuration server 310 is operatively associated with a database 314 that is configured to store information relating to contracts or other agreements to provide voice mailboxes. The voice mailbox configuration server 310 is also coupled to a voice mailbox system 312 that hosts voice mailboxes that are accessible via a communications network, here shown as a network 350 configured to provide wireless services to wireless terminals 340, e.g., through a public switched telephone network (PSTN) and/or wireless infrastructure components. The voice mailbox configuration server 310 is configured to receive a voice mailbox configuration message, here shown as a Simple Object Access Protocol (SOAP) message 322 transmitted by a voice mailbox configuration client 320 over, for example, an IP (Internet Protocol) network 330. The voice mailbox configuration server 310 is further operative to configure a voice mailbox in the voice mailbox system 312 responsive to the received message based on a record of an agreement to provide voice mailboxes stored in a database 314. A similar record of the agreement may be maintained on the client side, e.g., in a database 322 that is operatively associated with the voice mailbox configuration client 320.

The voice mailbox configuration client 320 may be configured, for example, to provide a browser-type interface that includes fields for entry of data for configuration of a voice mailbox for a user, such as telephone number, security identification, and the like. The voice mailbox configuration client 320 may be operative to generate the voice mail configuration message 322 responsive to the entered data. Alternatively, or in conjunction with such an interface, the voice mailbox configuration client 320 may be configured to receive information from another electronic process, e.g., a web server or the like, that intakes voice mailbox requests from third parties. In response to such requests, the voice mailbox configuration client 320 may automatically generate voice mail configuration messages 322. For example, a third party may access web page maintained by a reseller, and request a voice mailbox by entering appropriate personal data, credit card information, etc. In response to such data entry, the reseller may automatically achieve configuration of a mailbox for the requesting party from its pre-purchased mailboxes after, for example, verifying the information provided with the request.

As shown, the voice mailbox configuration server 310 may be further operative, perhaps in conjunction with the voice mailbox system 312 and/or the database 314, to provide information messages 315 to the voice mailbox configuration client 320. For example, the voice mailbox configuration server 310 may be configured to provide billing information to the voice mailbox configuration client 320 that may reflect, for example, the number of mailboxes that are actually assigned to third parties under a bulk mailbox provision agreement. For example, a user interface may be provided by the voice mailbox configuration client 320 so that, for example, a voice mailbox reseller can transmit queries to the voice mailbox configuration server 320 to inquire as to the status of various mailboxes under a bulk agreement, and the voice mailbox configuration server 310 may be operative to transmit information messages 315 in response to such queries. Alternatively, or in combination with such a demand-driven approach, information messages 315 may be sent in an event-driven or periodic fashion.

It will be appreciated that SOAP may be an advantageous protocol for providing voice mailbox configuration and/or other messages according to some embodiments of the present invention. As is known to those skilled in the art, SOAP is a protocol for exchange of information in a decentralized, distributed environment. SOAP defines the use of XML (eXtensible Markup Language) to access services, objects, and servers in a platform-independent manner. SOAP can be used in combination with a variety of existing protocols and formats including HTTP (HyperText Transfer Protocol), SMTP (Simple Mail Transfer Protocol), and MIME (Multipurpose Internet Mail Extensions), and can support a wide range of applications. It includes an envelope that defines a framework for describing what is in a message and how to process it, a set of encoding rules for expressing instances of application-defined datatypes, and a convention for representing remote procedure calls and responses. SOAP is generally described at http://msdn.microsoft.com.

It will be understood that the voice mailbox system 312, the database 314, the voice mailbox configuration client 320, and the voice mail configuration server 310 may be implemented in a number of different ways, using any of a variety of different hardware and/or software. For example, the voice mailbox configuration server 310 may be implemented in software executing on a mainframe computer, an enterpriser server computer, or other computer apparatus controlled by a voice mailbox provider organization (e.g., a telephone operating company). The voice mailbox system 312 and/or the database 314 may be implemented on the same computer and/or on other computer systems linked to the computer(s) hosting the voice mailbox configuration server 310. The voice mailbox configuration client 320 may be implemented, for example, on a mainframe computer workstation, personal computer, microcomputer or other computer controlled by a voice mailbox reseller, such as a wireless provider, university or other organization. It will be further appreciated that, although a SOAP implementation is described with reference to FIG. 3, other messaging protocols may be used with the present invention.

It will be appreciated that the present invention encompasses a variety of arrangements beyond those described above. In particular, definition of a voice mailbox configuration interface according to some embodiments of the present invention, such as a SOAP-type interface that allows a bulk purchaser of voice mailbox space to configure voice mailboxes in a pre-purchased block of voice mailbox space via standardized-format electronic configuration messages, enables the creation of a variety of different voice mailbox sales and service scenarios. For example, voice mailbox space may be brokered through a series of resellers, as voice mailbox configuration messages may be configured to provide authentication information, e.g., digital certificates, that may be used to verify the right of an end purchaser to configure voice mailboxes that are hosted by a particular supplier. Accordingly, the present invention can enable creation and maintenance of a voice mailbox market that can be used to efficiently allocate voice mailbox services responsive to market factors.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of providing voice mail services, the method comprising:

storing an electronic record of an agreement between first and second parties for provision of voice mailboxes;

receiving an electronic voice mailbox configuration message from the second party for configuration of a voice mailbox under the agreement for a third party that is a customer of the second party;

automatically configuring the voice mailbox responsive to the received voice mailbox configuration message based on the stored electronic record of the agreement; and responsively providing access to the configured voice mailbox to the third party via a communications network.

2. A method according to claim 1, wherein automatically configuring the voice mailbox comprises configuring a voice mailbox feature.

3. A method according to claim 2, wherein the voice mailbox feature comprises at least one of a mailbox type, a pager notification feature, an operator zero out feature, a child mailbox feature, and a line sharing feature.

4. A method according to claim 1, wherein receiving an electronic voice mailbox configuration message comprises receiving a Simple Object Access Protocol (SOAP) message from a data communications network.

5. A method according to claim 1, wherein storing an electronic record of an agreement between first and second parties for provision of voice mailbox services comprises storing an electronic record of an agreement between the first and second parties to provide a predetermined number of voice mailboxes to the second party.

6. A method according to claim 1, further comprising billing the second party for voice mail services based on a number of voice mailboxes that are assigned to third parties.

7. A method according to claim 5, further comprising providing an electronic voice mailbox activity report to the second party.

8. A method according to claim 1, wherein receiving an electronic voice mailbox configuration message and automatically configuring the voice mailbox are performed by computer apparatus controlled by the first party.

9. A method according to claim 1, wherein automatically configuring the voice mailbox is preceded by authenticating the received voice mailbox configuration message.

10. A method of providing voice mail services, the method comprising:

storing an electronic record of an agreement between first and second parties for provision of voice mailboxes; and transmitting by the second party an electronic voice mailbox configuration message for automatic configuration of a voice mailbox based on the stored electronic record of the agreement for a third party that is a customer of the second party.

11. A method according to claim 10, wherein the electronic voice mailbox configuration message is configured to control at least one of voice mailbox access and voice mailbox features.

12. A method according to claim 10, wherein the electronic voice mailbox configuration message comprises a SOAP message.

13. A method according to claim 10, wherein transmitting an electronic voice mailbox configuration message is performed by computer apparatus controlled by the second party.

14. A voice mail apparatus, comprising:

a database that stores an electronic record of an agreement between first and second parties for provision of voice mailboxes; and a voice mailbox configuration server configured to receive from the second party via a data communications network an electronic voice mailbox configuration message for configuration of a voice mailbox under the agreement for a third party that is a customer of the second party and operative to automatically configure the voice mailbox responsive to the received voice mailbox configuration message based on the stored electronic record of the agreement and to responsively provide access to the configured voice mailbox to the third party via a communications network.

15. An apparatus according to claim 14, wherein the electronic voice mailbox configuration message comprises SOAP message.

16. A voice mail apparatus, comprising:

a database that stores an electronic record of an agreement between first and second parties for provision of voice mailboxes; and a voice mailbox configuration client configured to transmit over a data communications network an electronic voice mailbox configuration message for automatic configuration of a voice mailbox based on the stored electronic record of the agreement for a third party that is a customer of the third party.

17. A method according to claim 16, wherein the electronic voice mailbox configuration message is configured to control voice mailbox access and/or voice mailbox features.

18. A method according to claim 16, wherein the electronic voice mailbox configuration message comprises a SOAP message.

19. A method according to claim 16, wherein the agreement comprises an agreement for provision of a predetermined number of voice mailboxes.

20. A computer-readable storage medium comprising program code embodied therein, the program code comprising:

first program code configured to store an electronic record of an agreement between first and second parties for provision of voice mailboxes; and second program code configured to receive from the second party an electronic voice mailbox configuration message for configuration of a voice mailbox under the agreement for a third party that is a customer of the second party and operative to automatically configure the voice mailbox responsive to the received voice mailbox configuration message based on the stored electronic record of the agreement and to responsively provide access to the configured voice mailbox to the third party via a communications network.

21. A computer-readable storage medium according to claim 20, wherein the second program code is operative to configure the voice mailbox to control access to the voice mailbox by the third party responsive to the received electronic voice mail configuration message.

22. A computer-readable storage medium according to claim 20, wherein the electronic voice mailbox configuration message comprises a SOAP message.

23. A computer-readable storage medium comprising program code embodied therein, the program code comprising:

first program code configured to store an electronic record of an agreement between first and second parties for provision of voice mailboxes in bulk; and second program code configured to create an electronic voice mailbox configuration message for automatic configuration of a voice mailbox under the agreement for a third party that is a customer of the second party based on the stored electronic record of the agreement.

24. A computer-readable storage medium according to claim 23, wherein the electronic voice mailbox configuration message is configured to control at least one of voice mailbox access and voice mailbox features.

25. A computer-readable storage medium according to claim 23, wherein the electronic voice mailbox configuration message comprises a SOAP message.

* * * * *